(12) United States Patent
Torigai

(10) Patent No.: US 7,203,137 B2
(45) Date of Patent: Apr. 10, 2007

(54) OPTICAL PICKUP UNIT AND OPTICAL DISC DEVICE

(75) Inventor: Tsuyoshi Torigai, Tokyo (JP)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 10/866,679

(22) Filed: Jun. 15, 2004

(65) Prior Publication Data

US 2005/0018556 A1  Jan. 27, 2005

(30) Foreign Application Priority Data

Jun. 30, 2003  (JP) .............................. 2003-187237

(51) Int. Cl.
 *G11B 7/00* (2006.01)
(52) U.S. Cl. ................. 369/44.15; 369/53.19
(58) Field of Classification Search ...................... None
 See application file for complete search history.

(56) References Cited

U.S. PATENT DOCUMENTS 6,795,258 B2 * 9/2004 Jang ........................... 359/822
7,016,125 B2 * 3/2006 Nakamura et al. ........... 359/814
7,054,235 B2 * 5/2006 Tsukuda et al. .......... 369/44.15

FOREIGN PATENT DOCUMENTS

| JP | 2001-110076 | 4/2001 |
|---|---|---|
| JP | 2001-143291 | 5/2001 |

* cited by examiner

*Primary Examiner*—Paul W. Huber
(74) *Attorney, Agent, or Firm*—Oblon, Spivak, McClelland, Maier & Neustadt, P.C.

(57) ABSTRACT

An optical pickup unit is provided with a knife-edged support mechanism, which tiltably supports a suspension holder on a vertical support portion of a base such that the suspension holder can be tilted in a tilting direction with respect to an axis line extending perpendicular to both the focusing direction, i.e. z-axis direction, and the tracking direction, i.e. x-axis direction.

13 Claims, 4 Drawing Sheets

OPTICAL PICKUP UNIT AND OPTICAL DISC DEVICE

BACKGROUND OF THE INVENTION

1. Field of the Invention

The present invention relates to optical pickup units and optical disc devices used for recording data on and/or playing back data recorded on optical recording media, for example, known high-density discs such as CDs and DVDs. In particular, the present invention relates to an optical disc device provided with a three-axis optical pickup unit which is capable of moving an objective lens for focus adjustment and tracking adjustment, and moreover, for compensation for the skew of an optical recording medium.

2. Description of the Related Art

A typical three-axis optical pickup unit used for recording data on and playing back data recorded on an optical recording medium, such as a CD or a DVD, generally includes an objective lens for focusing a light beam on a data-recording surface of the optical recording medium; a lens holder for supporting the objective lens; and a fixed suspension holder. The lens holder is supported by four suspension wires which are attached to the fixed suspension holder. Specifically, the lens holder is supported by the four suspension wires in a cantilevered manner.

The lens holder has a focusing coil and a pair of tracking coils mounted thereon. For focus adjustment, a magnetic circuit which includes a yoke and a magnet exhibits an electromagnetic effect, and thus allows the focusing coil to move the objective lens in the focusing direction, namely, a direction in which the objective lens moves toward and away from the data-recording surface of the optical recording medium. Moreover, for tracking adjustment, the electromagnetic effect of the magnetic circuit allows the tracking coil to move the objective lens in the tracking direction, namely, the radial direction of the optical recording medium. Accordingly, the optical pickup unit emits a light beam toward the data-recording surface of the optical recording medium via the objective lens and can thus focus the light beam on the data-recording surface so as to record data onto the optical recording medium or to playback data recorded on the optical recording medium.

Furthermore, conventional optical pickup units are provided with two sets of tilting magnets and tilting coils for the purpose of adjusting the objective lens to compensate for skewing of the optical recording medium. One of the two sets is mounted adjacent to the rear end of the lens holder, and the other set is mounted to a section of the suspension holder facing the rear end of the lens holder. An electric current, which compensates for a skew angle formed between the optical axis of the objective lens and the data-recording surface of the optical recording medium, is applied to the tilting coils. This generates a magnetic field in the tilting coils and thus gives rise to an electromagnetic effect between the tilting coils and the tilting magnets, causing the lens holder to rotate in the direction in which the four suspension wires are twisted. Consequently, this tilts the optical axis of the objective lens to relatively reduce the skew angle between the data-recording surface of the optical recording medium and the objective lens. Japanese Unexamined Patent Application Publication No. 2001-110076 discloses an example of a conventional optical pickup unit.

In such a conventional optical pickup unit, the electromagnetic effect generated between the tilting coils and the tilting magnets causes the four suspension wires to twist simultaneously with one another for rotating the lens holder, allowing the optical axis of the objective lens to tilt with respect to the data-recording surface of the optical recording medium for the compensation of the skew angle. This is problematic in view of the fact that the tilting operation during this skew-angle compensation process adversely affects the focus adjustment and the tracking adjustment. In particular, the tilting operation during the skew-angle compensation process may cause a direct-current offset signal to be added to the tracking error signal for the objective lens, and can thus deteriorate the precision of the tracking adjustment of the objective lens. Moreover, this may also cause a problem in that the optical pickup unit may have difficulty in performing a recording operation or a playback operation for high-precision discs such as DVDs.

In such a conventional optical pickup unit, when a tilting operation is performed for the skew-angle compensation, the four suspension wires supporting the lens holder in a cantilevered manner are twisted in the tilting direction. Because the electromagnetic effect generated between the tilting coils and the tilting magnets forces the suspension wires to twist in a certain direction, if there are differences in torsion among the suspension wires, for example, the central tilting axis-line of the lens holder may deviate from the perpendicular-intersecting point between the axis-line and the optical axis of the objective lens. Moreover, this may cause the intersecting point to be too distant from a principle point on the optical axis of the objective lens, which is an ideal point that does not affect the optical characteristics of the objective lens during the skew-angle compensation process. As a result, this may deteriorate the performance of the objective lens during the skew-angle compensation process, and can thus cause problems when recording data on and/or playing back data recorded on a high-density disc such as a DVD.

SUMMARY OF THE INVENTION

Accordingly, it is an object of the present invention to provide an optical disc device provided with an optical pickup unit in which the focusing adjustment and the tracking adjustment of an objective lens are less affected when the objective lens is being tilted to compensate for the skew angle of an optical recording medium.

According to a first aspect of the present invention, an optical pickup unit is provided. The optical pickup unit includes an objective lens which faces a data-recording surface of an optical recording medium; a movable lens holder for supporting the objective lens; a tiltable suspension holder disposed distant from the lens holder; a support element which extends between the lens holder and the suspension holder and supports the lens holder such that the lens holder can be moved in a focusing direction and a tracking direction. The focusing direction is aligned with an optical axis of the objective lens and is perpendicular to the data-recording surface of the optical disc, and the tracking direction is the same as the radial direction of the optical recording medium. The optical pickup unit further includes a focusing-driving element for driving the lens holder in the focusing direction; a tracking-driving element for driving the lens holder in the tracking direction; a base on which the lens holder and the suspension holder are disposed; a knife-edged support mechanism which supports the suspension holder such that the suspension holder can be tilted on the base in a tilting direction, the suspension holder being tiltable about an axis line perpendicular to both the focusing direction and the tracking direction; and a tilt-driving element for driving the lens holder and the suspension holder in the tilting direction with respect to the axis line. The optical pickup unit of the present invention emits a light beam toward the data-recording surface of the optical recording medium via the objective lens so as to record data on the data-recording surface or to playback data based on the light beam reflected from the data-recording surface.

Furthermore, according to a second aspect of the present invention, an optical disc device is provided. The optical disc device includes an optical pickup unit which is movable in the radial direction of an optical recording medium by means of a feeding unit; a controlling element for controlling the rotation of the optical recording medium and the movement of the optical pickup unit based on a recording operation and/or a playback operation; and a signal-processing element which processes signals for the optical pickup unit so as to record data on and/or playback data recorded on the optical recording medium. The optical pickup unit in the optical disc device includes an objective lens which faces a data-recording surface of an optical recording medium; a movable lens holder for supporting the objective lens; a tiltable suspension holder disposed distant from the lens holder; a support element which extends between the lens holder and the suspension holder and supports the lens holder such that the lens holder can be moved in a focusing direction and a tracking direction. The focusing direction is aligned with an optical axis of the objective lens and is perpendicular to the data-recording surface of the optical disc, and the tracking direction is the same as the radial direction of the optical recording medium. The optical pickup unit further includes a focusing-driving element for driving the lens holder in the focusing direction; a tracking-driving element for driving the lens holder in the tracking direction; a base on which the lens holder and the suspension holder are disposed; a knife-edged support mechanism which supports the suspension holder such that the suspension holder can be tilted on the base in a tilting direction, the suspension holder being tiltable about an axis line perpendicular to both the focusing direction and the tracking direction; and a tilt-driving element for driving the lens holder and the suspension holder in the tilting direction with respect to the axis line.

According to the optical pickup unit and the optical disc device provided with the optical pickup unit of the respective first and second aspects of the present invention, the knife-edged support mechanism allows the suspension holder to be tiltably supported on the base such that the suspension holder can be tilted in the tilting direction about the axis line perpendicular to both the focusing direction and the tracking direction.

Consequently, the focusing adjustment and the tracking adjustment of the objective lens are less affected when the objective lens is being tilted to compensate for the skew angle of an optical recording medium. Moreover, with respect to the compensation for the skew angle of the optical recording medium, high-precision control for the tilting operation of the objective lens is achieved.

Furthermore, according to such a structure of the present invention, a perpendicular relationship between the optical axis of the objective lens and the axis line, around which the suspension holder tilts in the tilting direction, can be stably maintained. Moreover, the intersecting point between the axis line and the optical axis is extremely close to a principle point on the optical axis of the objective lens. The principle point is an ideal point that does not affect the optical characteristics of the objective lens during the compensation process for the skew angle of the optical disc. Consequently, this prevents the performance of the objective lens from deteriorating during the compensation process, and allows a smooth operation for recording on or playing back a high-density disc such as a DVD.

DESCRIPTION OF THE PREFERRED EMBODIMENTS

Embodiments of an optical pickup unit 104 and an optical disc device 101 provided with the optical pickup unit 104 according to the present invention will now be described with reference to the drawings.

Figure 1:
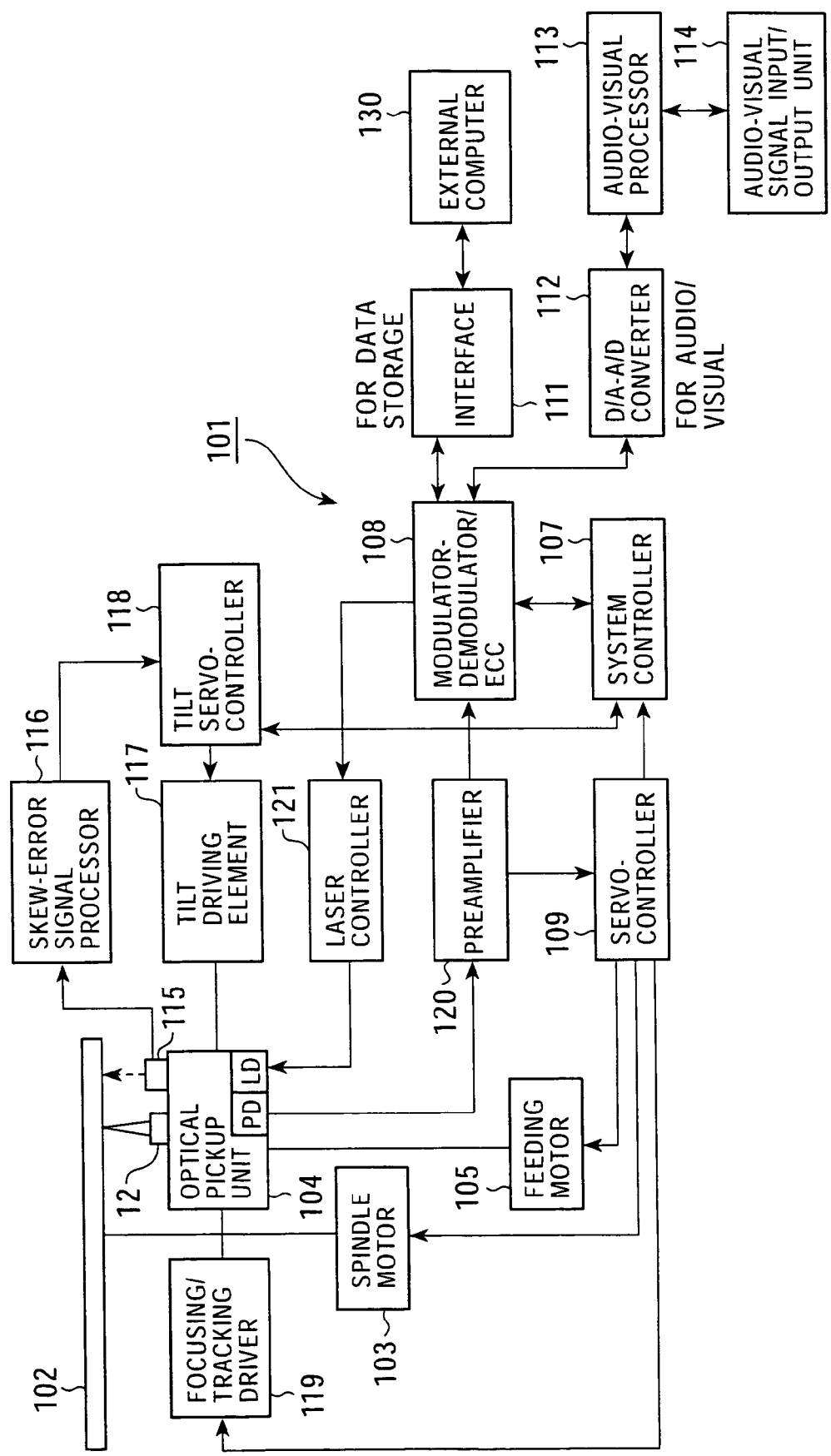
FIG. 1 is a block diagram of an optical disc device provided with an optical pickup unit and a skew sensor according to the present invention.
Figure 2:
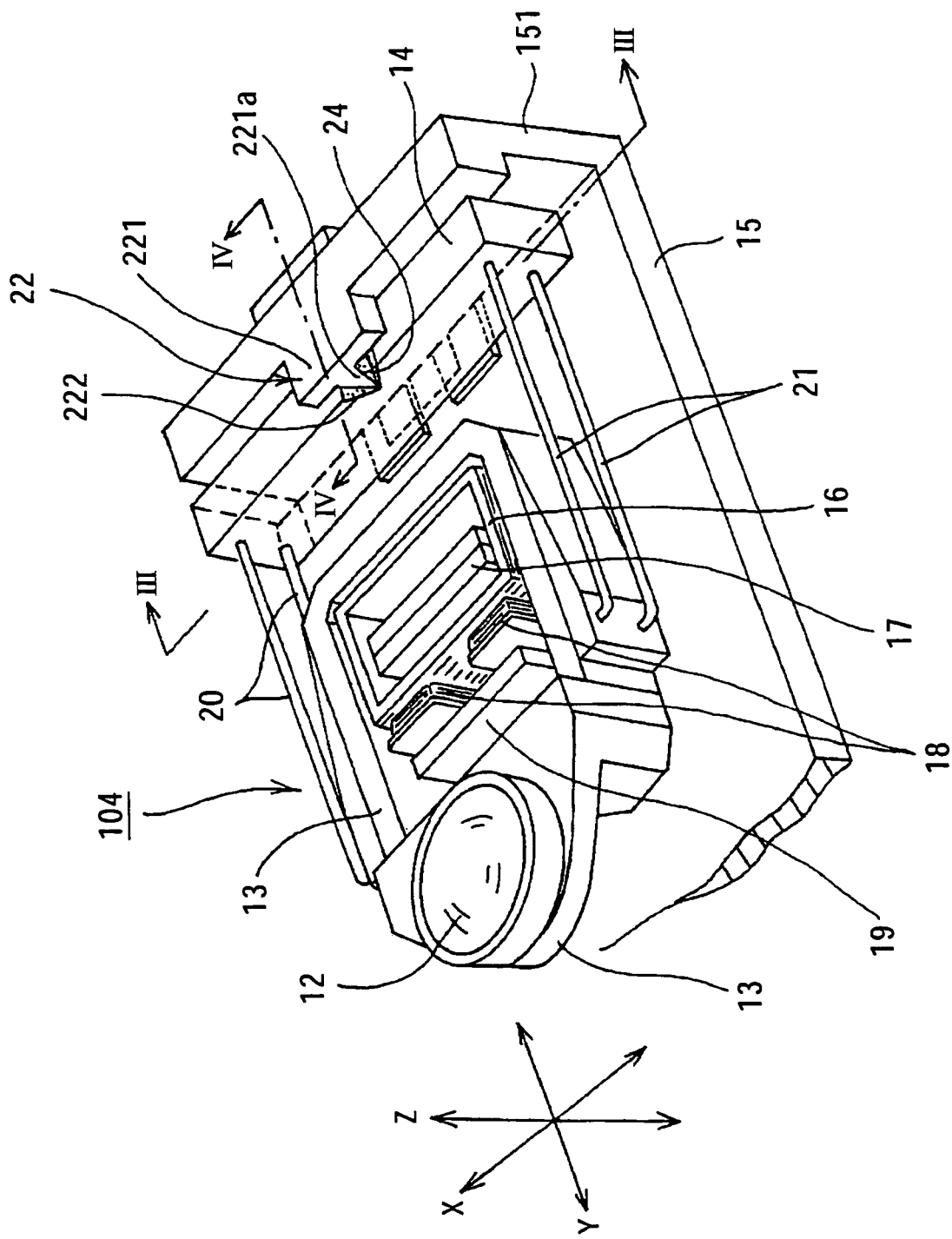
FIG. 2 is a perspective view of the optical pickup unit according to an embodiment of the present invention.
Figure 3:
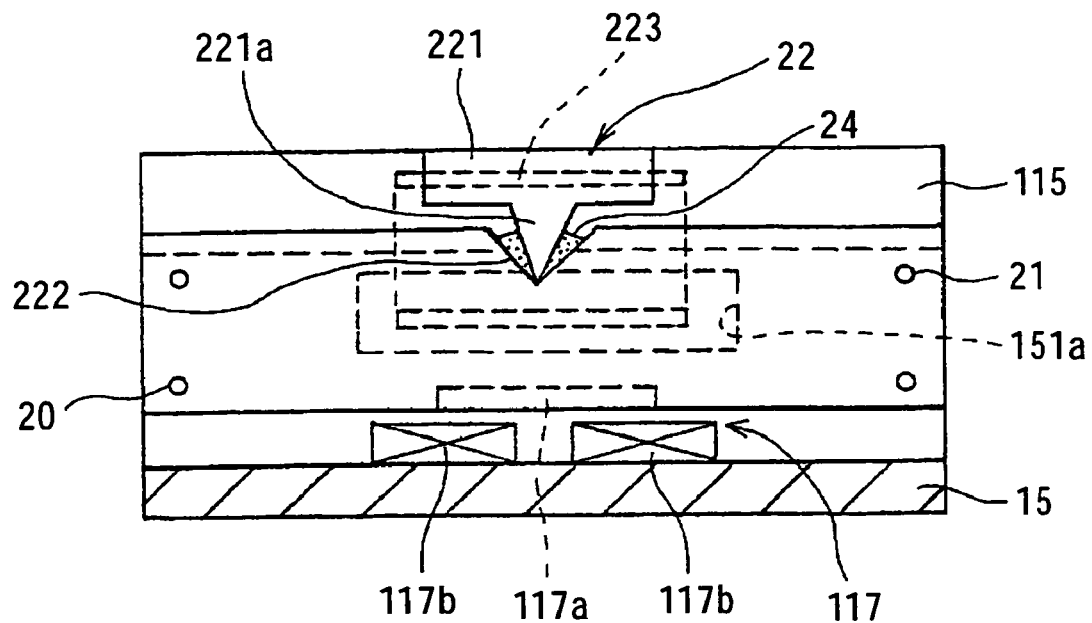
FIG. 3 is a front view of the optical pickup unit taken along line III—III in FIG. 2.
Figure 4:
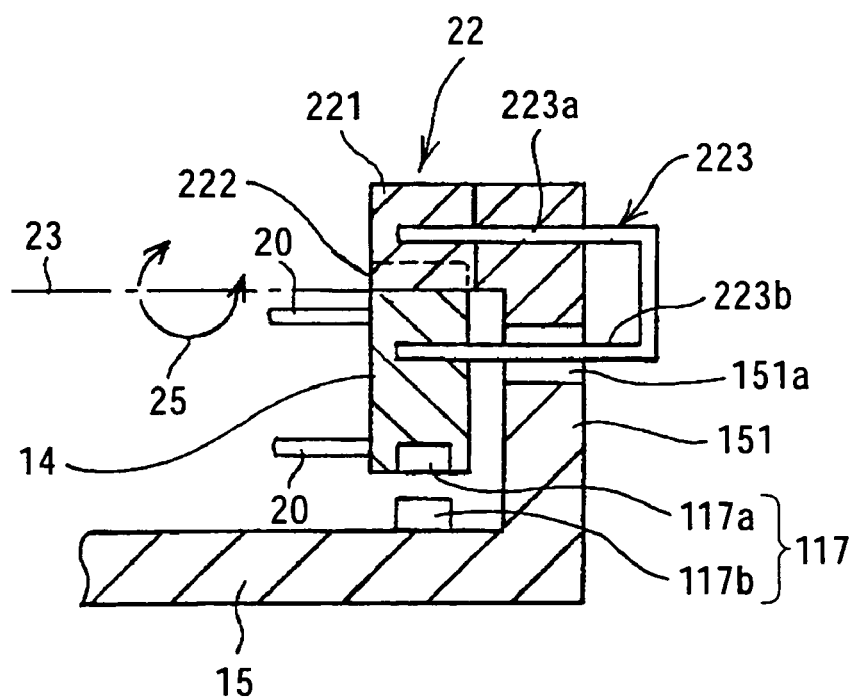
FIG. 4 is a cross-sectional view of the optical pickup unit taken along line IV—IV in FIG. 2.
Figure 5:
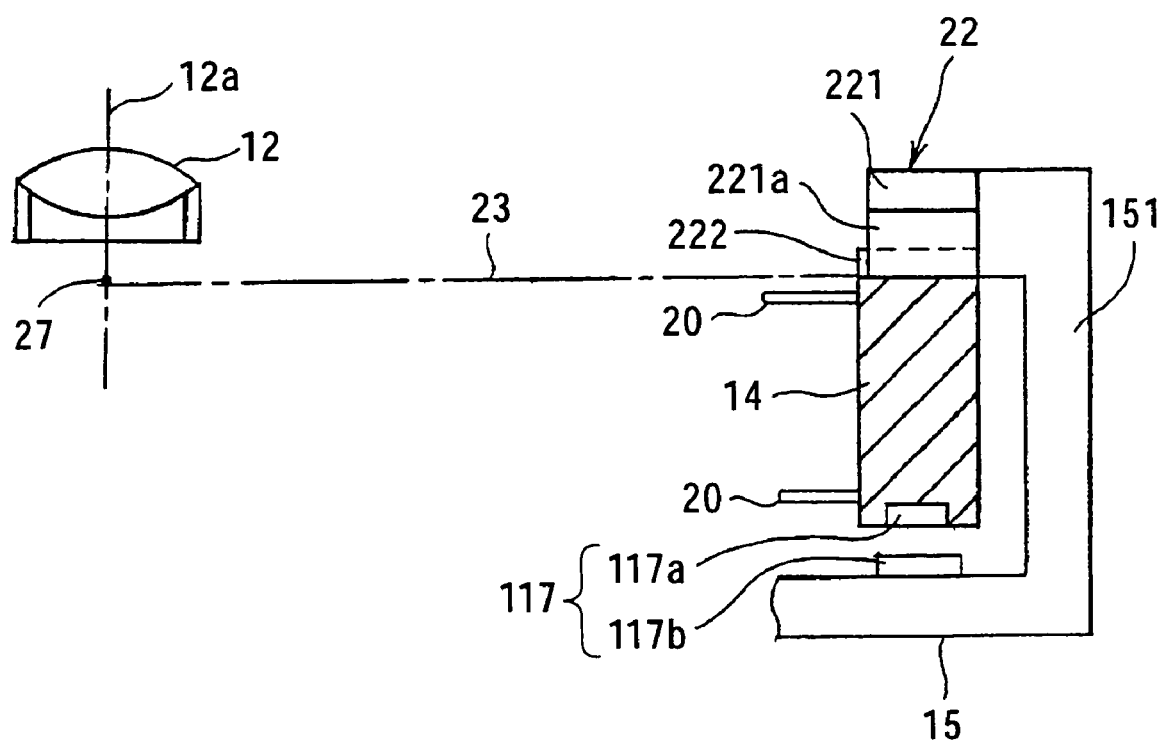
FIG. 5 is a schematic diagram illustrating the positional relationship between a knife-edged component and an objective lens according to the embodiment of the present invention.

FIG. 1 is a block diagram of the optical disc device 101 provided with the optical pickup unit 104 and a skew sensor 115 according to the present invention. FIG. 2 is a perspective view of the optical pickup unit 104 according to an embodiment of the present invention. FIG. 3 is a front view of the optical pickup unit 104 taken along line III—III in FIG. 2. FIG. 4 is a cross-sectional view of the optical pickup unit 104 taken along line IV—IV in FIG. 2. FIG. 5 is a schematic diagram illustrating the positional relationship between a knife-edged component 221 and an objective lens 12 according to the embodiment of the present invention.

The structure of the optical disc device 101 in FIG. 1 will first be described.

The optical disc device 101 is provided with a spindle motor 103 which functions as a driving unit for rotating an optical disc 102, namely, an optical recording medium such as a CD, a DVD, an MD, a CD-R, or a CD-RW; the optical pickup unit 104; and a feeding motor 105 which functions as a driving unit for driving the optical pickup unit 104 in the radial direction of the optical disc 102.

The optical disc device 101 is further provided with a system controller 107 and a servo-controller 109. The spindle motor 103 and the feeding motor 105 are driven by the servo-controller 109 at a predetermined rotational speed in response to a command signal from the system controller 107.

The optical disc device 101 is further provided with a modulator-demodulator/ECC 108 which modulates and demodulates signals and also adds error-correction codes to signals.

In response to a command signal from the modulator-demodulator/ECC 108, the optical pickup unit 104 emits light beams toward a read/write point on a data-recording surface of the rotating optical disc 102 via a light source LD which may be, for example, a laser-emitting source. Furthermore, the optical pickup unit 104 detects light beams reflected from the data-recording surface of the rotating optical disc 102 via a photodetector PD provided in the optical pickup unit 104. The optical pickup unit 104 sends various types of output signals from the photodetector PD to a preamplifier 120.

Based on the type of output signal received from the photodetector PD, the preamplifier 120 correspondingly generates, for example, a focusing error signal, a tracking error signal, and an RF signal. Furthermore, according to the type of optical recording medium subject to playback, the servo-controller 109 and the modulator-demodulator/ECC 108, for example, perform a predetermined operation, such as demodulation and error correction, based on the corresponding signals received from the preamplifier 120.

If a recorded signal demodulated by the modulator-demodulator/ECC 108 is, for example, intended for data storage in a computer, the signal is sent to, for example, an external computer 130 via an interface 111. Accordingly, the external computer 130, for example, can receive the signal recorded on the optical disc 102 as a playback signal.

On the other hand, if a recorded signal demodulated by the modulator-demodulator/ECC 108 is intended for audio-visual purposes, the signal is converted from digital to analog in a D/A component of a D/A-A/D converter 112 and is sent to an audio-visual processor 113. The signal is then processed to form an audio-video signal by the audio-visual processor 113 and is sent to an external image projector via an audio-visual signal input/output unit 114.

The feeding motor 105 is connected to the optical pickup unit 104 for moving the optical pickup unit 104 to a specific recording track on the optical disc 102. The feeding motor 105 and the spindle motor 103 are controlled by the servo-controller 109. Moreover, the servo-controller 109 also controls a focusing/tracking driver 119, which is provided for driving the optical pickup unit 104 with respect to two axes, to move the objective lens 12 in the focusing direction and the tracking direction.

Furthermore, a laser controller 121 is provided for controlling the light source LD in the optical pickup unit 104. In detail, the laser controller 121 adjusts the output intensity of the light source LD based on whether a recording mode or a playback mode is in effect.

The optical pickup unit 104 is further provided with the skew sensor 115 which detects the skew of the optical disc 102 with respect to the optical axis of the objective lens 12. The detected signal of the skew sensor 115 is sent to a skew-error signal processor 116 where the signal is converted to a skew-error signal corresponding to the skew angle of the optical disc 102. The skew-error signal is then input to a tilt servo-controller 118.

In response to the skew-error signal, the tilt servo-controller 118 actuates a tilt-driving element 117 to tilt the objective lens 12 to an appropriate position so that the optical axis of the objective lens 12 is set perpendicular to the data-recording surface of the optical disc 102.

Furthermore, the tilt servo-controller 118 can also be controlled based on a command signal from the system controller 107.

The structure of the optical pickup unit 104 according to the present invention will now be described with reference to FIGS. 2 to 4.

The optical pickup unit 104 shown in FIG. 2 is a three-axis optical pickup unit which is capable of moving the objective lens 12 in three directions, namely, the focusing direction, the tracking direction, and the tilting direction. Specifically, the focusing direction is aligned with the z-axis which is perpendicular to the data-recording surface of the optical disc 102 shown in FIG. 1. The tracking direction is aligned with the x-axis, which is the same as the radial direction of the optical disc 102. The tilting direction refers to a direction in which the optical pickup unit 104 tilts around an axis line 23 shown in FIGS. 4 and 5. The y-axis is aligned with the axis line 23 and is perpendicular to both the x-axis and the z-axis. By moving the objective lens 12 in the three directions, the optical pickup unit 104 is capable of compensating for vibration, decentering, and skewing of the optical disc 102.

Referring to FIG. 2, the optical pickup unit 104 is provided with the objective lens 12 which is disposed in a manner such that the objective lens 12 faces the data-recording surface of the optical disc 102; a lens holder 13 which supports the objective lens 12 such that the optical axis of the objective lens 12 is aligned with the z-axis; a suspension holder 14 which is disposed perpendicular to the thickness direction of the optical disc 102 and is distant from a side of the lens holder 13 opposite to the side adjacent to the objective lens 12 such that a space is formed between the suspension holder 14 and the lens holder 13; and a base 15 which covers the back surface of the suspension holder 14, i.e. a surface distant from the objective lens 12, and the bottom surface of the lens holder 13. The base 15 supports the optical pickup unit 104 and is also movable in the radial direction of the optical disc 102.

The lens holder 13 has a focusing coil 16 mounted thereon for driving the lens holder 13 in the z-axis direction, i.e. the focusing direction. The base 15 has a magnet 17 mounted thereon, and the surfaces of the magnet 17 face the focusing coil 16. The focusing coil 16 and the magnet 17 define a focusing-driving element.

Furthermore, the lens holder 13 has a pair of tracking coils 18 mounted thereon for driving the lens holder 13 in the x-axis direction, i.e. the tracking direction. The base 15 has a magnet 19 mounted thereon, and one of the surfaces of the magnet 19 faces the tracking coils 18. The tracking coils 18 and the magnet 19 define a tracking-driving element.

The optical pickup unit 104 is further provided with a pair of suspension wires 20 and a pair of suspension wires 21. The suspension wires 20 are parallel to each other, and similarly, the suspension wires 21 are also parallel to each other. With respect to the x-axis direction of the lens holder 13, two sides of the lens holder 13 have first ends of the suspension wires 20 and first ends of the suspension wires 21 attached thereto, respectively. On the other hand, second ends of the suspension wires 20 and second ends of the suspension wires 21 are attached to two end portions of the suspension holder 14, respectively. The two pairs of suspension wires 20 and 21 support the lens holder 13 in a movable manner such that the lens holder 13 can be moved in the focusing direction, i.e. the z-axis direction, which is aligned with the optical axis of the objective lens 12 and is perpendicular to the data-recording surface of the optical disc 102, and the tracking direction, i.e. the x-axis direction, which is the same as the radial direction of the optical disc 102. The two pairs of suspension wires 20 and 21 define a support element. Furthermore, the suspension wires 20 and 21 also function as signal lines for transferring signals to the focusing coil 16 and the tracking coils 18.

The base 15 has a vertical support portion 151 which extends perpendicularly from the base 15. The vertical support portion 151 faces the back surface of the suspension holder 14 and is thus parallel to the back surface. The vertical support portion 151 supports the suspension holder 14 in a tiltable manner via a knife-edged support mechanism 22. In detail, the knife-edged support mechanism 22 functions as a support between the vertical support portion 151 and the suspension holder 14 such that the suspension holder 14 can tilt around the axis line 23 (see FIG. 4) which is perpendicular to the focusing direction, i.e. the z-axis, and the tracking direction, i.e. the x-axis.

Referring to FIGS. 2 to 4, the knife-edged support mechanism 22 includes a knife-edged component 221 provided in the top central region of the vertical support portion 151, a V-shaped engagement groove 222 provided on the top surface of the suspension holder 14 and corresponds to the knife-edged component 221, and a spring 223. Specifically, the knife-edged component 221 is provided with an edge portion 221a which has an inverted-triangular shape that extends downward to engage with the engagement groove 222 of the suspension holder 14. The spring 223 urges against the knife-edged component 221 and the suspension holder 14 from the upward and downward directions so as to maintain the engagement state between the edge portion 221a and the engagement groove 222.

The spring 223 is made by bending a leaf spring to form a substantially "U" shape. Referring to FIG. 4, a top portion 223a of the U-shaped spring 223 is fixed to the vertical support portion 151 and the suspension holder 14 by press-fitting the top portion 223a into the back surface of the vertical support portion 151 toward the suspension holder 14. On the other hand, a bottom portion 223b of the spring 223 is fixed to the suspension holder 14 by inserting the bottom portion 223b through a hole 151a provided in the vertical support portion 151 and then press-fitting the bottom portion 223b into the suspension holder 14.

Referring to FIGS. 2 and 3, the engagement section between the edge portion 221a and the engagement groove 222 is provided with silica gel 24 for damping purposes.

Referring to FIGS. 3 to 5, the tilt-driving element 117 drives the suspension holder 14 and the lens holder 13, which is supported by the suspension holder 14 via the suspension wires 20 and 21, in the tilting direction with respect to the axis line 23. The tilt-driving element 117 includes a magnet 117a provided at the center of the bottom surface of the suspension holder 14, and a pair of tilting coils 117b which are disposed on the base 15 and face the magnet 117a.

According to the optical pickup unit 104, if the chucking of the optical disc 102, such as a CD or a DVD, on a turntable or the curvature of the optical disc 102 causes the optical disc 102 to skew, the skew sensor 115 detects this skew of the optical disc 102. The detected signal of the skew sensor 115 is sent to the skew-error signal processor 116 where the signal is converted to a skew-error signal corresponding to the skew angle of the optical disc 102. An electric current which compensates for the skew-error signal is then applied to the tilting coils 117b of the tilt-driving element 117 via the tilt servo-controller 118. Referring to FIG. 4, this generates a magnetic field in the tilting coils 117b and thus gives rise to an electromagnetic effect between the tilting coils 117b and the magnet 117a, causing the suspension holder 14 to tilt around the axis line 23 in the tilting direction indicated by an arrow 25. Accordingly, the lens holder 13 and the suspension holder 14 are tilted such that the optical axis of the objective lens 12 is set perpendicular to the data-recording surface of the optical disc 102. This compensates for the skew angle of the optical disc 102.

In the optical pickup unit 104 and the optical disc device 101 provided with the optical pickup unit 104 according to this embodiment, the suspension holder 14 is supported by the base 15 via the knife-edged support mechanism 22, meaning that the knife-edged component 221 acts as a support between the suspension holder 14 and the vertical support portion 151. Thus, the frictional resistance in this supporting region is substantially zero. Consequently, with respect to the compensation for the skew angle of the optical disc 102, this achieves high-precision control for the tilting operation of the objective lens 12. Moreover, the focus adjustment and the tracking adjustment for the objective lens 12 are less affected when the objective lens 12 is being tilted to compensate for the skew angle of the optical disc 102.

Furthermore, according to this embodiment, referring to FIG. 5, a perpendicular relationship between an optical axis 12a of the objective lens 12 and the axis line 23, around which the suspension holder 14 tilts in the tilting direction, can be stably maintained. This is due to the structure of this embodiment in which the suspension holder 14 is supported by the vertical support portion 151 of the base 15 in a tiltable manner via the knife-edged support mechanism 22. Moreover, the intersecting point between the axis line 23 and the optical axis 12a is extremely close to a principle point 27 on the optical axis 12a of the objective lens 12. The principle point 27 is an ideal point that does not affect the optical characteristics of the objective lens 12 during the compensation process for the skew angle of the optical disc 102. Consequently, this prevents the performance of the objective lens 12 from deteriorating during the compensation process, and allows a smooth operation for recording on or playing back a high-density disc such as a DVD.

Furthermore, since the silica gel 24 is provided in the engagement section between the edge portion 221a of the knife-edged component 221 and the engagement groove 222, the supported region of the suspension holder 14 can maintain a damped state.

In the above embodiment, although the knife-edged component 221 of the knife-edged support mechanism 22 is provided in the vertical support portion 151 of the base 15, and the engagement groove 222 is provided in the suspension holder 14, the present invention is not limited to these structures. For example, these structures may alternatively be disposed the other way around: that is, the knife-edged component 221 may be provided in the suspension holder 14 and the engagement groove 222 may be provided in the vertical support portion 151 of the base 15. Moreover, the position of the knife-edged support mechanism 22 is not limited to the position described in the above embodiment.

Furthermore, in the above embodiment, although the magnet 117a and the tilting coils 117b of the tilt-driving element 117 are respectively disposed on the bottom surface of the suspension holder 14 and sections of the base 15 facing the magnet 117a, the present invention is not limited to this structure. For example, two sets of magnets 117a and tilting coils 117b may alternatively be provided such that the first set is disposed at one longitudinal end of the suspension holder 14 and the second set is disposed at the other end of the suspension holder 14, and the magnet 117a and the tilting coil 117b of each set face each other.

Furthermore, in the knife-edged support mechanism 22 of the above embodiment, although the spring 223 is used to maintain the engagement state between the edge portion 221a of the knife-edged component 221 and the engagement groove 222, the present invention is not limited to such a structure. For example, a similar effect may be accomplished by disposing a coil spring between the bottom surface of the suspension holder 14 and a section of the base 15 facing the bottom surface.

What is claimed is:

1. An optical pickup unit comprising:
  an objective lens which faces a data-recording surface of an optical recording medium;
  a movable lens holder for supporting the objective lens;

a tiltable suspension holder disposed distant from the lens holder;

a support element which extends between the lens holder and the suspension holder and supports the lens holder such that the lens holder can be moved in a focusing direction and a tracking direction, the focusing direction being aligned with an optical axis of the objective lens and being perpendicular to the data-recording surface of the optical disc, the tracking direction being the radial direction of the optical recording medium;

a focusing-driving element for driving the lens holder in the focusing direction;

a tracking-driving element for driving the lens holder in the tracking direction;

a base on which the lens holder and the suspension holder are disposed;

a knife-edged support mechanism which supports the suspension holder such that the suspension holder can be tilted on the base in a tilting direction, the suspension holder being tiltable about an axis line perpendicular to both the focusing direction and the tracking direction; and a tilt-driving element for driving the lens holder and the suspension holder in the tilting direction with respect to the axis line, wherein the optical pickup unit emits a light beam toward the data-recording surface of the optical recording medium via the objective lens so as to record data on the data-recording surface or to playback data based on the light beam reflected from the data-recording surface.

2. The optical pickup unit according to claim 1, wherein the knife-edged support mechanism comprises a knife-edged component extending from a first one of the suspension holder and the base such that said first one engages with the remaining second one of the suspension holder and the base, the knife-edged component having an edge portion; an engagement groove which is provided in said second one of the suspension holder and the base and engages with the edge portion of the knife-edged component; and a spring which urges against the suspension holder and the base to maintain the engagement state between the edge portion and the engagement groove.

3. The optical pickup unit according to claim 2, wherein the engagement section between the edge portion of the knife-edged component and the engagement groove contains gel for damping purposes.

4. The optical pickup unit according to claim 1, wherein the tilt-driving element comprises a pair of tilting coils disposed on one of the suspension holder and the base; and a magnet disposed on the remaining one of the suspension holder and the base such that the magnet faces the pair of tilting coils.

5. The optical pickup unit according to claim 1, wherein the support element comprises a plurality of flexible suspension wires.

6. The optical pickup unit according to claim 5, wherein the suspension wires function as supporting components and as signal lines for transferring signals to the focusing-driving element and the tracking-driving element.

7. An optical disc device comprising:
an optical pickup unit which is movable in the radial direction of an optical recording medium by means of a feeding unit;
a controlling element for controlling the rotation of the optical recording medium and the movement of the optical pickup unit based on a recording operation and/or a playback operation; and
a signal-processing element which processes signals for the optical pickup unit so as to record data on and/or playback data recorded on the optical recording medium;

wherein the optical pickup unit comprises:
an objective lens which faces a data-recording surface of the optical recording medium;
a movable lens holder for supporting the objective lens;
a tiltable suspension holder disposed distant from the lens holder;
a support element which extends between the lens holder and the suspension holder and supports the lens holder such that the lens holder can be moved in a focusing direction and a tracking direction, the focusing direction being aligned with an optical axis of the objective lens and being perpendicular to the data-recording surface of the optical disc, the tracking direction being the radial direction of the optical recording medium;
a focusing-driving element for driving the lens holder in the focusing direction;
a tracking-driving element for driving the lens holder in the tracking direction;
a base on which the lens holder and the suspension holder are disposed;
a knife-edged support mechanism which supports the suspension holder such that the suspension holder can be tilted on the base in a tilting direction, the suspension holder being tiltable about an axis line perpendicular to both the focusing direction and the tracking direction; and
a tilt-driving element for driving the lens holder and the suspension holder in the tilting direction with respect to the axis line.

8. The optical disc device according to claim 7, wherein the knife-edged support mechanism comprises a knife-edged component extending from a first one of the suspension holder and the base such that said first one engages with the remaining second one of the suspension holder and the base, the knife-edged component having an edge portion; an engagement groove which is provided in said second one of the suspension holder and the base and engages with the edge portion of the knife-edged component; and a spring which urges against the suspension holder and the base to maintain the engagement state between the edge portion and the engagement groove.

9. The optical disc device according to claim 8, wherein the engagement section between the edge portion of the knife-edged component and the engagement groove contains gel for damping purposes.

10. The optical disc device according to claim 7, wherein the tilt-driving element comprises a pair of tilting coils disposed on one of the suspension holder and the base; and a magnet disposed on the remaining one of the suspension holder and the base such that the magnet faces the pair of tilting coils.

11. The optical disc device according to claim 7, wherein the support element comprises a plurality of flexible suspension wires.

12. The optical disc device according to claim 11, wherein the suspension wires function as supporting components and as signal lines for transferring signals to the focusing-driving element and the tracking-driving element.

13. The optical disc device according to claim 7, further comprising a skew sensor which detects the skew of the optical recording medium with respect to the optical axis of the objective lens, and a tilt servo-controlling element which generates a skew-error signal corresponding to the skew angle of the optical recording medium based on the detected signal of the skew sensor and controls the tilt-driving element based on the skew-error signal so that the optical axis of the objective lens is set perpendicular to the data-recording surface of the optical recording medium.

* * * * *